(12) United States Patent
Schudt et al.

(10) Patent No.: US 9,869,399 B2
(45) Date of Patent: Jan. 16, 2018

(54) SLIDE VALVE, IN PARTICULAR FOR CONTROLLING A MOTOR VEHICLE AUTOMATIC TRANSMISSION

(71) Applicant: Robert Bosch GmbH, Stuttgart (DE)

(72) Inventors: Klaus Schudt, Nordheim (DE); Erwin Mueller, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 309 days.

(21) Appl. No.: 14/724,309

(22) Filed: May 28, 2015

(65) Prior Publication Data

US 2015/0354715 A1 Dec. 10, 2015

(30) Foreign Application Priority Data

Jun. 4, 2014 (DE) .................. 10 2014 210 530

(51) Int. Cl.
| | |
|---|---|
| *F16K 11/07* | (2006.01) |
| *F16K 31/06* | (2006.01) |
| *F16H 61/02* | (2006.01) |
| *B01D 35/02* | (2006.01) |
| *B01D 29/00* | (2006.01) |

(52) U.S. Cl.
CPC ...... *F16K 11/0708* (2013.01); *B01D 29/0095* (2013.01); *B01D 35/02* (2013.01); *F16H 61/0251* (2013.01); *F16K 31/0613* (2013.01); *F16H 2061/0253* (2013.01)

(58) Field of Classification Search
CPC ............. F16K 11/0708; F16K 31/0613; B01D 29/0095; B01D 35/02; F16H 61/0251; F16H 2061/0253
See application file for complete search history.

(56) References Cited

U.S. PATENT DOCUMENTS

| 5,984,259 | A | * | 11/1999 | Najmolhoda | ...... | G05D 16/2093 |
| | | | | | | 137/625.64 |
| 6,189,985 | B1 | * | 2/2001 | Fritsch | ...... | B60T 8/36 |
| | | | | | | 137/550 |
| 6,328,065 | B1 | * | 12/2001 | Schmid | ...... | G05D 16/2013 |
| | | | | | | 137/596.17 |
| 6,529,106 | B1 | * | 3/2003 | Linhoff | ...... | B60T 15/028 |
| | | | | | | 251/129.15 |
| 2003/0137378 | A1 | * | 7/2003 | Parker | ...... | F02M 57/025 |
| | | | | | | 335/220 |

(Continued)

FOREIGN PATENT DOCUMENTS

| DE | 197 33 660 | 2/1999 |
| DE | 198 47 304 | 5/2000 |

(Continued)

*Primary Examiner* — Krishnan S Menon
*Assistant Examiner* — Waqaas Ali
(74) *Attorney, Agent, or Firm* — Norton Rose Fulbright US LLP; Gerard Messina

(57) ABSTRACT

A slide valve, in particular for controlling a motor vehicle automatic transmission, has a housing which includes an axial end section. A connector sleeve is situated on the axial end section of the housing, the connector sleeve having a larger diameter in a first axial area adjacent to the housing and a smaller diameter in a second axial area remote from the housing, a filter device being situated in the first axial area. The second axial area includes a hydraulic connection.

13 Claims, 2 Drawing Sheets

(56) References Cited

U.S. PATENT DOCUMENTS

| | | | | |
|---|---|---|---|---|
| 2005/0139273 A1* | 6/2005 | Morselli | ............. | F16K 31/0613 137/625.64 |
| 2008/0237524 A1* | 10/2008 | Lee | ......................... | B60T 8/363 251/324 |
| 2009/0255593 A1* | 10/2009 | Nordstrom | .......... | F16K 31/0613 137/544 |
| 2009/0256091 A1* | 10/2009 | Nordstrom | .......... | F16K 31/0613 251/129.15 |
| 2013/0061959 A1* | 3/2013 | Stephens | ................. | F01L 1/344 137/544 |
| 2013/0220461 A1* | 8/2013 | Shigeta | ..................... | F16K 1/30 137/624.27 |
| 2014/0251470 A1* | 9/2014 | Bissbort | ................ | F15B 11/167 137/565.17 |
| 2015/0354715 A1* | 12/2015 | Schudt | ................ | F16H 61/0251 210/435 |

FOREIGN PATENT DOCUMENTS

DE  10 2005 059 433  6/2007
DE  10 2010 039 918  3/2010

\* cited by examiner

SLIDE VALVE, IN PARTICULAR FOR CONTROLLING A MOTOR VEHICLE AUTOMATIC TRANSMISSION

RELATED APPLICATION INFORMATION

The present application claims priority to and the benefit of German patent application no. 10 2014 210 530.7, which was filed in Germany on Jun. 4, 2014, the disclosure of which is incorporated herein by reference.

FIELD OF THE INVENTION

The present invention relates to a slide valve.

BACKGROUND INFORMATION

Automatic transmissions for motor vehicles in which hydraulically activatable clutches are used for shifting the gears are known from the market. For shifting operations to take place smoothly and unnoticeable to the driver, a comparatively high precision of the hydraulic components is required. For example, electromagnetically operable pressure control valves are used for this purpose. Such pressure control valves may be impaired during operation by possible dirt particles in the fluid to be controlled. For that reason, filters are often provided which are able to filter these particles from the fluid. Patent publications from this technical field include, for example, DE 198 47 304 C2, DE 10 2005 059 433 A1, DE 197 33 660 A1 and DE 10 2010 039 918 A1.

SUMMARY OF THE INVENTION

The problem underlying the present invention is solved by a slide valve according to the description herein. Advantageous refinements are recited in the further descriptions herein. The following description and the drawings contain significant features for the present invention, it being possible for the features to be significant for the present invention both alone and in various combinations, without explicitly re-emphasizing this.

The present invention relates to a slide valve, in particular for controlling a motor vehicle automatic transmission, having an essentially cylindrical housing which includes an axial end section. According to the present invention, a connector sleeve, which is also essentially cylindrical, is situated on the axial end section of the housing, the connector sleeve having a larger diameter in a first axial area adjacent to the housing and a smaller diameter in a second axial area remote from the housing. A filter device is situated in the first axial area. The second axial area includes a hydraulic connector, in particular a so-called "control pressure connection." The slide valve according to the present invention is thus, for example, a pressure control valve.

Pressure control valves, in particular for controlling automatic transmissions, may have, for example, hydraulic pressures of up to approximately 20 bar on an inflow connection and the control pressure connection. This may cause comparatively high hydraulic forces, which act on the pressure control valve via O-ring seals present radially outside on the slide valve, i.e., for example, coaxial to the housing. For example, the slide valve includes two O-ring seals having different diameters. For the aforementioned pressure forces, a circular area determined by the particular O-ring seal is decisive. A fastening device with the aid of which the pressure control valve is situated on the automatic transmission or another section of the motor vehicle must thus be capable of absorbing or transferring comparatively high forces.

To minimize these forces, it may on the one hand be practical to keep the diameter of the larger O-ring small. Accordingly, the area subjected to pressure is minimized and the hydraulic force is kept low. On the other hand, it may be practical to implement what may be a great difference of the diameters between the larger and the smaller O-ring. This may result in advantages in the positioning and installation of the hydraulic connections on the slide valve. As a result, the two above-named requirements for the diameters of the O-ring seals allow only a comparatively small diameter for the smaller O-ring.

The present invention makes it possible to implement the filter device with a comparatively large effective area despite this limitation. Among other things, this is made possible by the fact that the filter device is situated in the larger first axial area, which is adjacent to the housing. Here, the filter device is situated in the area having the larger first diameter. This advantageously makes it possible that an area effective for the filtering is not determined by the smaller of the two diameters but instead by the larger of the two, as a result of which the effective area is correspondingly larger. Where constructively required, the second axial area may even be configured to have a comparatively small diameter, without the effective area of the filter device being impaired.

In particular, it may be provided according to the present invention that the filter device is situated on an inner wall section of the connector sleeve, on which the first diameter merges into the second diameter. The filter device is thus to some extent supported in the axial direction by the shoulder formed by this wall section. This makes it possible to install the filter device in a manner that is in particular simple and simultaneously precise.

The filter device may be pressed into the connector sleeve. This makes it possible to pre-mount the filter device in the connector sleeve in a simple manner, which makes it possible to achieve cost savings. Thus, a so-called "two-piece filter hat" is made possible for the filter device, the "filter hat" thus being formed on the one hand by the filter device and on the other hand by the connector sleeve.

In an exemplary embodiment of the present invention, the filter device is held between the axial end section of the housing and the aforementioned inner wall section or shoulder of the connector sleeve between the first and second axial area. After the connector sleeve is installed on the housing—the connecting sleeve may be pressed radially onto the outside of the housing—the filter device is form-locked between the connector sleeve and the axial end section of the housing and is consequently positioned securely during the operation of the slide valve.

In another embodiment of the slide valve, a transition is continuously carried out, at least in sections, from the first diameter to the second diameter. In particular, this transition may include a radially circumferential "rounding," which not only has advantages with respect to flow, but also makes full use of the effective area of the filter device at the same time, when the filter device is in particular supported on the shoulder formed between the two diameter sections.

Furthermore, it may be provided that the filter device is essentially configured as a circular disk ("screen"), which includes a radially outer annular holding section and a radially inner filter section. This makes it possible to save space and consequently costs. Furthermore, the configuration of the filter device differentiated in this manner makes pressing into the connector sleeve simple and reliable, as has already been explained above.

In one embodiment of the slide valve, the filter device has an annular filter section lying radially outside and a supporting section essentially configured in the shape of a hat lying radially inside, on which a valve spring ("return spring") of the slide valve is supported. As a result, the filter device additionally includes the function of a spring seat for the valve spring, making it possible to save space and costs. This in fact makes it possible to reduce the effective area of the filter device if necessary; however, the remaining area (lying radially outside) is still comparatively large, thanks to the present invention.

Exemplary embodiments of the present invention will be explained below with reference to the drawings.

The same reference numerals are used for elements and sizes having corresponding functions also in the case of different specific embodiments.

DETAILED DESCRIPTION

Figure 1:
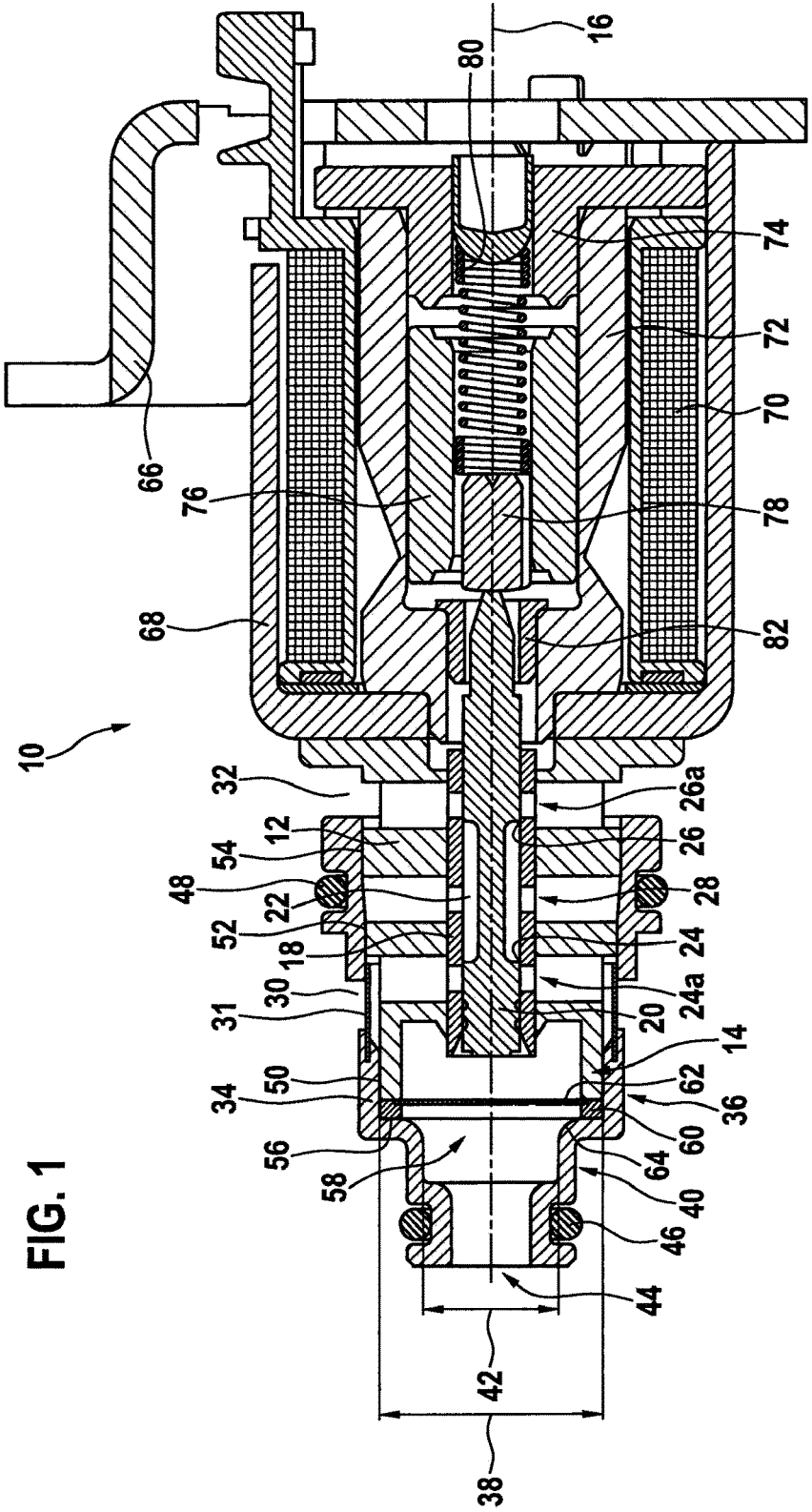
FIG. 1 shows a longitudinal section through a slide valve in a first specific embodiment.

FIG. 1 shows a longitudinal section through a slide valve 10, which in the present case may be used for controlling a motor vehicle automatic transmission. Slide valve 10 includes a generally stepped cylindrical housing 12 which has an axial end section 14 in a left area in the drawing. Housing 12 and axial end section 14 are essentially configured to be rotationally symmetrical to a longitudinal axis 16. A sliding sleeve 18 is situated centrally along longitudinal axis 16 radially within housing 12 and axial end section 14, and a valve slide 20 is situated centrally along longitudinal axis 16 radially within sliding sleeve 18. Sliding sleeve 18 may be extrusion-coated by a plastic material of housing 12.

Valve slide 20 has a circumferential recess 22 extending axially radially outside in an approximately axially central area. On axial end sections of recess 22, radially circumferential control edges 24 and 26 are configured on valve slide 20, the control edges interacting hydraulically with radial openings 24a, 26a and 28 of sliding sleeve 18. With the aid of radial openings 24a, 26a and 28 and associated hydraulic channels (without reference numerals, also in part not in the sectional plane) configured in housing 12, a radial inflow connection 30 and a radial outflow connection 32 are formed on slide valve 10 in a manner known per se. A filter fabric 31 is situated on inflow connection 30 radially outside in the present case, through which a fluid flowing into slide valve 10 via inflow connection 30 is filtered.

A stepped cylindrical connector sleeve 34 is situated on housing 12 radially outside and on axial end section 14 in the left area of the drawing. Connector sleeve 34 is essentially rotationally symmetrical and in the present case is made of a plastic material. Connector sleeve 34 has a larger first diameter 38 in a first axial area 36 adjacent to housing 12, and thus to the right, and a smaller second diameter 42 in a second axial area 40 remote from housing 12 and thus to the left. In FIG. 1, an axial control pressure connection 44 of slide valve 10 is situated to the left on second axial area 40 of connector sleeve 34. With the aid of inflow connection 30, outflow connection 32 and control pressure connection 44, slide valve 10 during operation is able to control or regulate a flow of fluid, for example, a hydraulic fluid for controlling a motor vehicle automatic transmission (not shown) in a manner known per se.

Furthermore, connector sleeve 34 has two radially circumferential outside seals 46 and 48, which are each configured as O-ring seals. On three axial sections 50, 52 and 54, connector sleeve 34 is situated radially circumferentially on the outside of housing 12 in a fluidically tight manner, and in the present case is pressed onto it.

Furthermore, connector sleeve 34 includes a radially circumferential inner wall section 56, on which first diameter 38 merges into second diameter 42, and which insofar forms a type of shoulder. A filter device 58 for filtering particles which may be present in the fluid is situated on inner wall section 56. Filter device 58 is configured as a circular disk ("screen") in FIG. 1 and includes a radially outer annular holding section 60 and a radially inner screen-like filter section 62. With the aid of holding section 60, filter device 58 is held between axial end section 14 of housing 12 and inner shoulder-like wall section 56 of connector sleeve 34. In the present case, filter device 58 on annular holding section 60 is pressed into connector sleeve 34.

In FIG. 1, it is apparent that a transition has been carried out continuously in sections from first diameter 38 to second diameter 42, and in the present case, with the aid of a circumferential rounding 64. As a result, the entire area of filter section 62 of filter device 58 is usable for the filtering of particles, despite the support on wall section 56.

In an area to the right in the drawing, slide valve 10 further includes an electromagnetic actuator ("electromagnet"), which in the drawing is situated to the right of housing 12 and includes a mounting 66 (to the right in FIG. 1) as well as an essentially cylindrical actuator housing 68. Among other things, the following elements are situated in actuator housing 68: a solenoid coil 70, magnetic guides 72 and 74, an axially movable armature 76, a coupling element 78, which couples armature 76 to valve slide 20 axially, an armature spring 80 configured as a coil spring and a guide sleeve 82.

During operation of slide valve 10, valve slide 20 may be moved axially in a manner known per se with the aid of the electromagnetic actuator, making it possible to control the fluid and consequently the motor vehicle automatic transmission. As a function of an operating condition of slide valve 10, the fluid may flow axially through filter section 62, any particles being filtered out if necessary and consequently made unable to disrupt the operation of slide valve 10.

Figure 2:
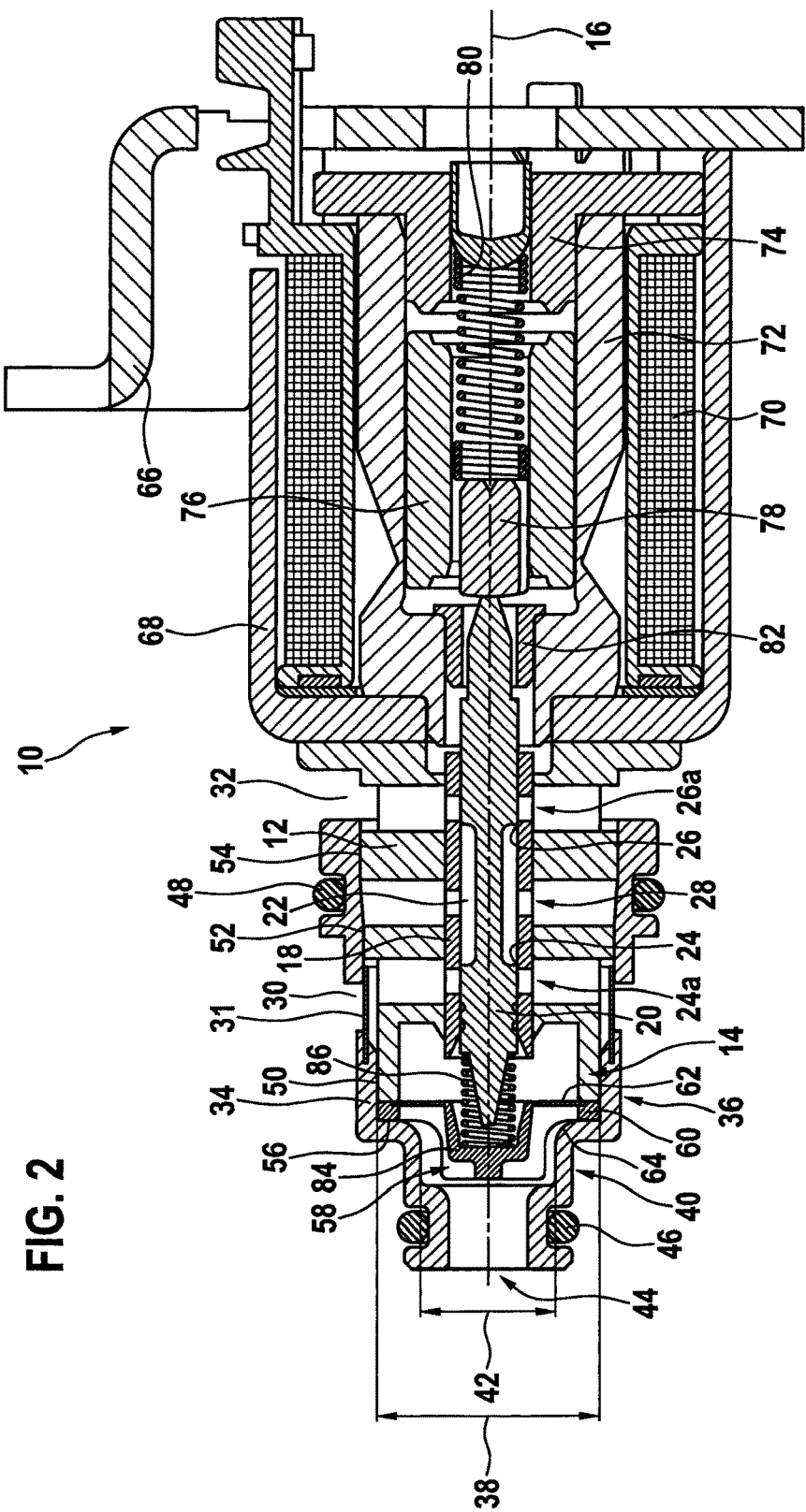
FIG. 2 shows a longitudinal section through the slide valve in a second specific embodiment.

FIG. 2 shows a longitudinal section through slide valve 10 in a second specific embodiment similar to FIG. 1. In contrast to it, filter device 58 of FIG. 2 additionally has a supporting section 84 in the shape of a hat lying radially inside, on which a valve spring 86 ("return spring") of slide valve 10 is supported. Valve spring 86 acts upon an axial end section (without a reference numeral) of valve slide 20 using a pressure force to the right as shown in the drawing and consequently counteracts the pressure force of armature spring 80. Comparable to FIG. 1—filter section 62 and holding section 60 are situated radially outside of supporting section 84. Due to radially inner supporting section 84, the area of filter section 62 is, however, smaller than in FIG. 1.

Slide valve 10 of FIG. 2 is operated in a manner comparable to the first specific embodiment of FIG. 1. Here, as a function of an operating condition of slide valve 10, fluid flows essentially axially through filter section 62, the fluid flowing around supporting section 84 radially outside.

What is claimed is:

1. A slide valve for controlling a vehicle transmission, comprising:
   a housing having an axial end section;
   a sliding sleeve mounted in and circumferentially surrounded by the housing;
   a valve slide axially movably mounted inside the sliding sleeve;
   a connector sleeve mounted on the axial end section of the housing in a fluid-tight manner, wherein the connector sleeve has a first inner diameter in a first axial area adjacent to the housing and a second inner diameter in a second axial area remote from the housing, the second inner diameter being smaller than the first inner diameter, and wherein a filter device is held within the first axial area, and the connector sleeve further includes a hydraulic connector remote from the housing, the hydraulic connector having an outside seal, the hydraulic connector having a third inner diameter smaller than the second inner diameter.

2. The slide valve of claim 1, wherein the filter device is held between an inner wall section of the connector sleeve and the axial end section of the housing, the first inner diameter merging into the second inner diameter via the inner wall section.

3. The slide valve of claim 1, wherein the filter device is pressed into the connector sleeve.

4. The slide valve of claim 1, wherein the filter device is held between the axial end section of the housing and the wall section of the connector sleeve between the first and second axial area.

5. The slide valve of claim 1, wherein inside the connector sleeve, the connector sleeve transitions from the first inner diameter to the second inner diameter via a rounded step.

6. The slide valve of claim 1, wherein the filter device includes a circular disk, the circular disk having a radially outer annular holding section and a radially inner filter section, wherein the circular disk is held, in its entirety, in the first axial area.

7. The slide valve of claim 6, wherein the filter device has an annular filter section radially outside the circular disk and a supporting section in the shape of a hat radially inside the circular disk, the supporting section supporting a valve spring of the slide valve.

8. The slide valve of claim 1, wherein the slide valve is for controlling a motor vehicle automatic transmission.

9. The slide valve of claim 1, wherein the axial end section circumferentially surrounds an end section of the sliding sleeve.

10. The slide valve of claim 2, wherein the filter device is held between the inner wall section of the connector sleeve and an end face of the axial end section of the housing.

11. The slide valve of claim 1, wherein the sliding sleeve has a plurality of openings, and the valve slide has a plurality of control edges that interact hydraulically with the openings.

12. The slide valve of claim 5, wherein inside the connector sleeve, the connector sleeve transitions from the second inner diameter to the third inner diameter via a rounded step.

13. The slide valve of claim 1, wherein the second axial area is between the first axial area and the hydraulic connector.

* * * * *